Patented Feb. 2, 1943

2,309,841

UNITED STATES PATENT OFFICE 2,309,841

PROCESS FOR THE PREPARATION OF NEW SOLUBLE AROMATIC AMIDO COMPOUNDS OF THERAPEUTIC VALUE

Paul Emile Charles Goissedet and Robert Ludovic Despois, Choisy-Le-Roi, France; vested in the Alien Property Custodian No Drawing. Application December 30, 1936, Serial No. 118,258. In Great Britain January 3, 1936

4 Claims. (Cl. 260—397.7)

The present invention relates to the preparation of new soluble derivatives of aromatic amido compounds having a bactericidal action.

It is known, for example, that p-amino-benzene-sulphonamide has a bactericidal action but that this substance cannot be used for purposes such as hypodermic injection on account of its insolubility in water. The salts of such compounds, particularly the hydrochlorides, are very soluble but they possess a very strong acid reaction in solution which constitutes a grave defect from the point of view of therapeutic usage.

According to the present invention it has been found that the reaction product obtained by the reaction of a formaldehyde-bisulphite on such amino compounds, i. e., on p-amino-benzene-sulphonamide or its nuclear substituted derivatives, still possesses strong bactericidal properties. For example, in the case of p-amino-benzene-sulphonamide, the product obtained by reaction with formaldehyde-bisulphite possesses bactericidal properties which are at least equal to those of p-amino-benzene-sulphonamide itself and the product does not have any of the drawbacks possessed by the salts of the p-amino-benzene-sulphonamide.

According to the present invention, the process for preparing the new compound consists in combining a formaldehyde-bisulphite with the aromatic amino compound. This combination can be effected in any known way, either by causing the amino compound to react directly with the solution of formaldehyde-bisulphite or in causing formaldehyde to react with the amino compound and then condensing the intermediate product obtained with sodium bisulphite.

The new compounds are colourless, crystalline compounds very soluble in water. Their solutions are colourless, stable, and of neutral reaction to litmus. When administered by injection they possess an excellent and very smooth bactericidal action.

The following examples show how the invention may be carried out in practice, but it is to be understood that the invention is not limited to the details given in these examples:

Example 1

43 grams of p-amino-benzene-sulphonamide are heated in suspension with a solution of 38 grams of a sodium formaldehyde bisulphite in 300 cc. of water for one hour on a water bath at 90° C. On cooling, a clear solution is obtained, and on evaporation of the solution a white, crystalline product is obtained which can be crystallised from 50% alcohol. The crystals obtained are soluble in water and give a colourless solution which is stable and neutral to litmus.

Example 2

16 cc. of a solution of 40% formaldehyde is added to a solution of 41.7 grams of p-amino-benzene-sulphonamide hydrochloride in 250 cc. of water. A white precipitate is formed consisting of methylene - amino - benzene - sulphonamide. After neutralising with sodium carbonate, the precipitate is filtered off. It is a white powder melting and decomposing at about 195° C. 18.4 grams of this compound are suspended in a solution of 9.5 grams of sodium meta bisulphite in 200 cc. of water. After a quarter of an hour, the product is heated to 80° C. and a clear solution is obtained from which a soluble compound can be isolated in the manner described in Example 1.

By using potassium metabisulphite instead of the sodium metabisulphite, the corresponding potassium compound may be produced in the same way.

Example 3

3-methoxy-4-amino-benzene-sulphonamide is prepared by treating acetyl-ortho-anisidine with chlorsulphonic acid and then causing the sulphonyl-chloride to react with ammonia. 3-methoxy-4-acetyl-amino-benzene-sulphonamide is thus obtained which, when recrystallised from dilute alcohol melts at 213° C. De-acetylised, for example by heating with dilute sulphuric acid, this substance furnishes 3-methoxy-4-amino-benzene-sulphonamide which, after recrystallisation from water, melts at 142° C.

50.5 grams of 3-methoxy-4-amino-benzene-sulphonamide are heated on a steam bath for 2 hours at 90° C. with 38 grams of sodium formaldehyde-bisulphite dissolved in 300 cc. of water. The sulphonamide passes into solution. On concentration a crystalline product is obtained which, dried to constant weight in vacuo, corresponds to the formula:

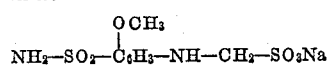

$NH_2-SO_2-C_6H_3-NH-CH_2-SO_3Na$ (with $OCH_3$ substituent)

Example 4

3-chlor-4-amino-benzene-sulphonamide is prepared in a manner similar to that of Example 3 starting from acetyl-ortho-chloraniline instead of acetyl-ortho-anisidine. It crystallises in water; melting point 161° C. Its acetyl derivative, recrystallised from dilute alcohol, melts at 199° C.

51.6 grams of 3-chlor-4-amino-benzene-sulphonamide are treated as in the preceding example with 38 grams of sodium formaldehyde-bisulphite. The corresponding sodium methylene-sulphonate is obtained.

What we claim and desire to secure by Letters Patent is:

1. The sodium-methylene-sulphonate of para-amino-benzene-sulphonamide.

2. The sodium-methylene-sulphonate of 3-methoxy-4-amino-benzene-sulphonamide.

3. The sodium-methylene-sulphonate of 3-chloro-4-amino-benzene-sulphonamide.

4. A compound of the formula:

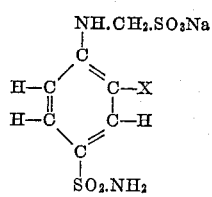

in which X is a member of the group consisting of hydrogen, chlorine, and methoxy group.

PAUL EMILE CHARLES GOISSEDET.
ROBERT LUDOVIC DESPOIS.